United States Patent [19]

Ramsower

[11] 4,113,029
[45] Sep. 12, 1978

[54] QUICK LATCH FOR FARM TOOL BAR

[76] Inventor: Vernon Ramsower, Rte. 3, Plainview, Tex. 79072

[21] Appl. No.: 769,433

[22] Filed: Feb. 17, 1977

[51] Int. Cl.² ............................................. A01B 51/00
[52] U.S. Cl. ................................ 172/272; 214/145 A; 172/688
[58] Field of Search ............... 172/250, 253, 245, 275, 172/272, 274, 451, 439, 697, 776, 687, 763; 214/145 A

[56] References Cited

U.S. PATENT DOCUMENTS

| 2,713,298 | 7/1955 | Lindeman | 172/451 X |
| 3,077,231 | 2/1963 | Hamilton | 172/451 |
| 3,091,299 | 5/1963 | Truelove | 172/776 |
| 3,239,015 | 3/1966 | Scott | 172/776 |
| 3,252,522 | 5/1966 | Taylor | 172/763 |
| 3,275,341 | 9/1966 | Ralston | 172/451 |
| 3,403,737 | 10/1968 | Byrd | 172/451 |
| 3,726,346 | 4/1973 | Thompson | 172/776 |
| 3,837,408 | 9/1974 | Green | 172/763 |
| 3,951,214 | 4/1976 | Ramsower | 172/274 |

FOREIGN PATENT DOCUMENTS

| 54,757 | 6/1943 | Netherlands | 172/274 |
| 849,677 | 9/1960 | United Kingdom | 172/272 |

*Primary Examiner*—Richard J. Johnson
*Attorney, Agent, or Firm*—Wendell Coffee

[57] ABSTRACT

Tool bars carrying plows are removably attached to a farm tractor by two or more rearwardly extending support arms. The support arms are attached to a frame connected to the standard three point power lift attachment of the farm tractor. The tool bars slide into C-shaped receiving portions of the support arm and are held in place by a lock member contacting the front of the tool bar.

7 Claims, 6 Drawing Figures

QUICK LATCH FOR FARM TOOL BAR

BACKGROUND OF THE INVENTION (1) Field of the Invention

This invention relates a means to facilitate mounting of an earth working implement on a motor vehicle.

(2) Description of the Prior Art

My prior U.S. Pat. No. 3,951,214, issued Apr. 20, 1976, discloses an apparatus for removably supporting an elongated tool bar. That patent discloses unimpeded support arms which extend to the rear of the tractor and are moved up and down by the power lift of the tractor. That patent claimed a locking bar which contacted the top of the tool bar to hold the tool bar securely in place.

FIG. 6 of that patent discloses C-shaped receiving portions on the support arm of the tool bar, having lock members contacting the front of the tool bar when the tool bar is in the C-shaped receiving portion.

That patent includes claims which specifically describe a locking bar which is pivoted to the front of the support arm and which extends over the tool bar unit and the locking bar is latched to the rear of the support arm.

SUMMARY OF THE INVENTION (1) New and Different Function

One species of this invention is shown in FIG. 6 of my prior patent. Although the C-shaped portions therein described and the locking members were activated by a lever, it is conceivable that the lever could extend up so it was accessible to the operator of the tractor in his normal operating position, which would normally be the cab of the tractor. I have devised other lock means which are more adaptable to be operated by one or more lanyards, which is much more adaptable to extend to the cab of a tractor. Therefore, this enables the operator of the tractor to disconnect a tool bar from the tractor, move the tractor to another tool bar and connect it to the tractor without ever leaving his operating position, the cab of the tractor. The farmer is able to do this while all the time using merely a tool bar assembly for his earth working implements. I.e., all of the hitch means and gauge wheels and the like are attached to the single frame member and it is not necessary for the farmer to have a large investment in several tools.

Thus it is that I have provided a new function of permitting a change of tools, without leaving the tractor, using very inexpensive tool bar assemblies. The mechanism to accomplish this new function has a result that is greater than the sum of the individual functions of the components thereof.

(2) Objects of this Invention

An object of this invention is to change earth working implements on a farm tractor.

Further objects are to achieve the above with a device that is sturdy, compact, durable, lightweight, simple, safe, efficient, versatile, and reliable, yet inexpensive and easy to manufacture, install, adjust, operate, and maintain.

Other objects are to achieve the above with a method that is versatile, rapid, efficient, and inexpensive, and does not require skilled people to install, adjust, operate, and maintain.

The specific nature of the invention, as well as other objects, uses, and advantages thereof, will clearly appear from the following description and from the accompanying drawing, the different views of which are not to the same scale.

DESCRIPTION OF THE PREFERRED EMBODIMENTS

Figure 1:
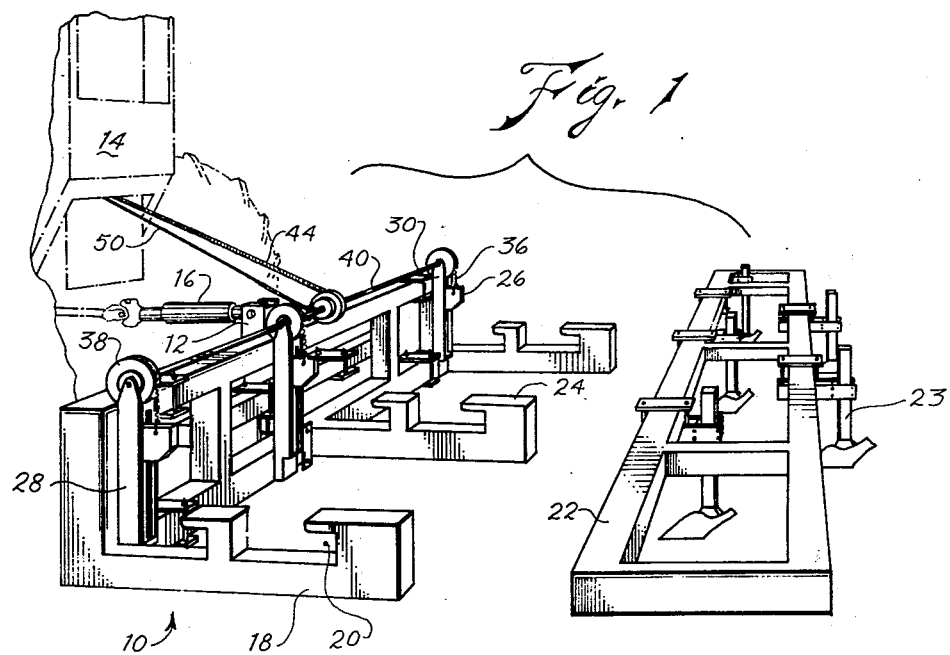
FIG. 1 is a perspective view showing an embodiment of this invention attached to a representation of a portion of a tractor with the tool bar unit to be attached separated therefrom.
Figure 3:
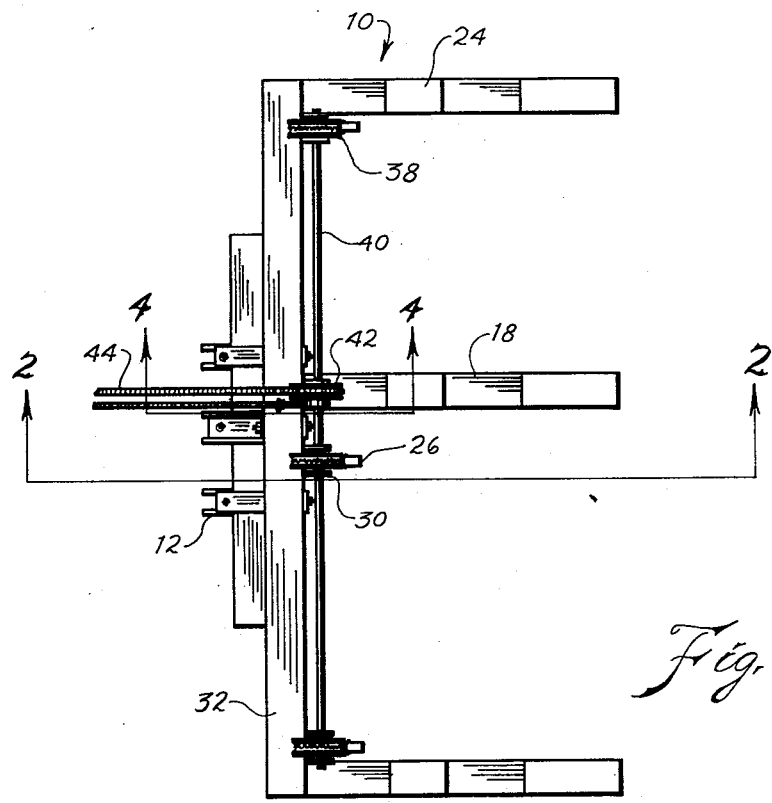
FIG. 3 is a top plan view of the first embodiment.
Figure 2:
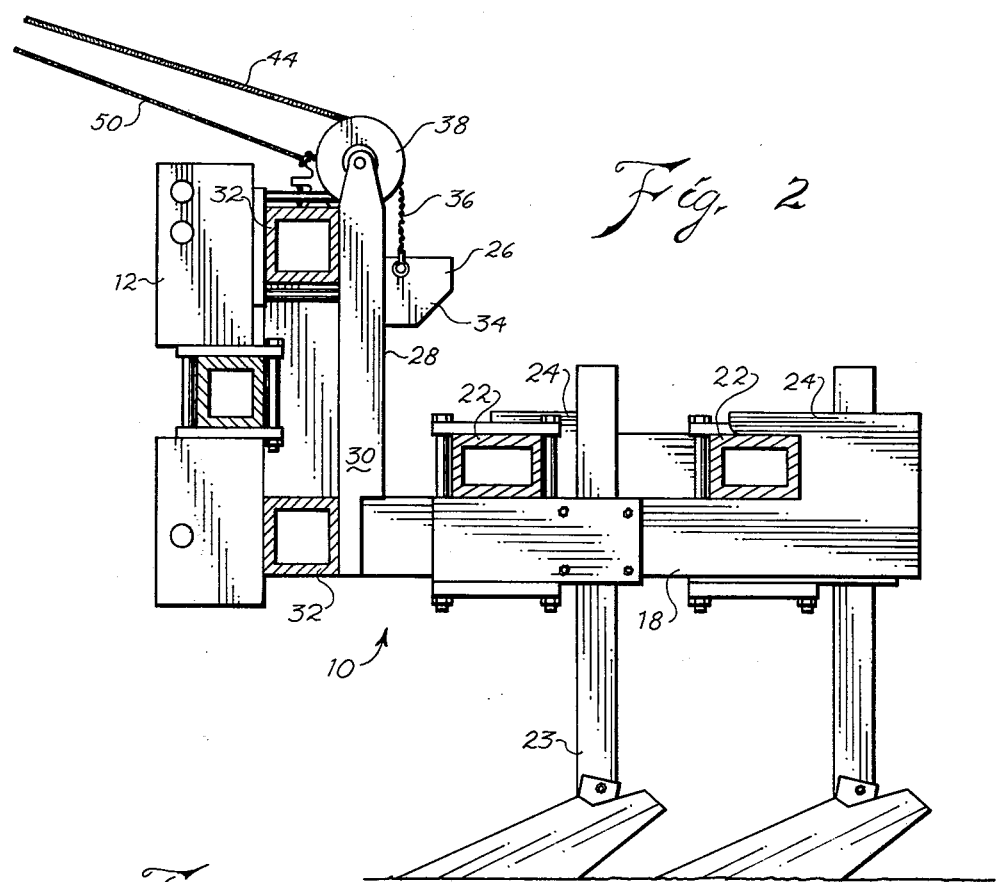
FIG. 2 is a sectional elevational view of the first embodiment taken substantially on line 2—2 of FIG. 3. with the tool bar unit attached.

Referring to the drawing, there may be seen frame 10. This frame is generally a reinforced frame having three point hitch 12 on the forward portion thereof. As is well known and understood the three point hitch is means for attaching the frame to a farm vehicle in the form of tractor 14. It will be understood that the tractor itself will have correlative hitch means 16 to the three point hitch 12 which form a means for raising and lowering the frame.

The frame has three rearwardly extending unimpeded support arms 18. Each of the support arms has at least one tool bar receiving portion 20 thereon and each of the tool bar receiving portions 20 upon the support arms 18 are substantially laterally aligned with the receiving portion of the other arms. Therefore, it may be seen that a tool bar assembly having two tool bars 22 thereon can be readily attached to the frame 10. Earth working tools 23 are on the tool bars 22. The process is that the operator on the tractor lowers the support arms by the tractor hitch 16 so the support arms will go underneath the tool bars 22. When the tool bars are properly positioned, the hitch is raised, raising the support arms; therefore, raising the tool bar 22. All that is necessary then is to lock the tool bars securely in place upon the support arms 18.

A study of my prior U.S. Pat. No. 3,951,214, noted above, will indicate that the detailed description to this point is the same as both disclosed and claimed in my prior patent. An embodiment as verbally described to this point has been on the market in public use and sale for over one year.

This application is concerned with an improved receiving portion 20 and an associated clamp to hold the tool bars in the receiving portion. Such receiving portion is C-shaped receiving portion or member 24 and, as such, was disclosed, but not claimed in my prior patent and is again disclosed here in FIG. 6.

Referring again to FIGS. 1 through 4, there may be seen that I have chosen to use an embodiment having the two tool bars 22 on the tool bar assembly and, therefore, two of the C-shaped clamp members on each of the support arms. Therefore, when the farmer is attaching the tractor to the tool bars, it is necessary after he has raised the tractor hitch 16 to move the tractor forward slightly so the arms 18 move forward with respect to the tool bar 22 to hold them in place; thereafter, all that is necessary is to move locking member 26 against the forward part of the tool bar 22 to hold it securely in place.

The mechanism as illustrated in FIGS. 1 through 4 includes track 28 upon post 30 which is attached to the frame 10. The posts may be attached to horizontal members 32 or to the forward portion of the support arms 18. It is necessary that the posts and the track be well forward of the forward most C-shaped receiving member. The locking member 26 is in the form of a slider which slides up and down on the track 28. As may be seen the lower portion of or contact edge 34 is beveled to help it move downward in the event the tool bar is not fully pocketed or positioned in the C-shaped receiving portion 24. I have found that all that is necessary is to have the locking member drop by gravity and raised by halyard 36.

Figure 4:
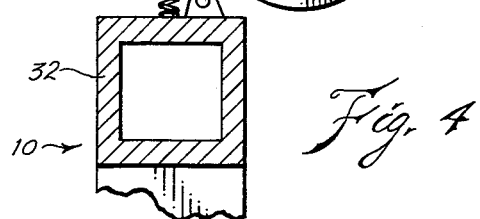
FIG. 4 is a side sectional view taken on line 4—4 of FIG. 3 showing details of the raising pulley.

The halyard 36 extends upward to and is wound on pulley or windlass 38, which is conveniently journaled to the top of the post 30. The pulley is securely attached to shaft 40 which extends laterally the length of the frame 10. About the center of the shaft 40, there is hoist pulley 42 attached to the shaft 40. Hoist line 44 is wound around the hoist pulley 42 so that pulling the hoist line will rotate the pulley in a counterclockwise direction as seen in FIG. 4, thus winding the halyard 36 upon the pulley 38 and thus raising the lock member 26.

When the lock members are fully raised, detent 46 engages in notch 48 on the hoist pulley 42, holding the lock members in the raised or inactive position. Lanyard 50 extends from the detent 46 to the cab of the tractor 14, which is the operator position, so the operator can raise or drop the lock members 26 without leaving the operating position in the tractor.

Analysis of the invention will show that it is only necessary to lock the tool bar into position in the center arm only and if it is securely locked at that point, it cannot become free. However, for additional security to insure that the tool bar will not become loose or free, a lock is provided for each arm.

Figure 5:
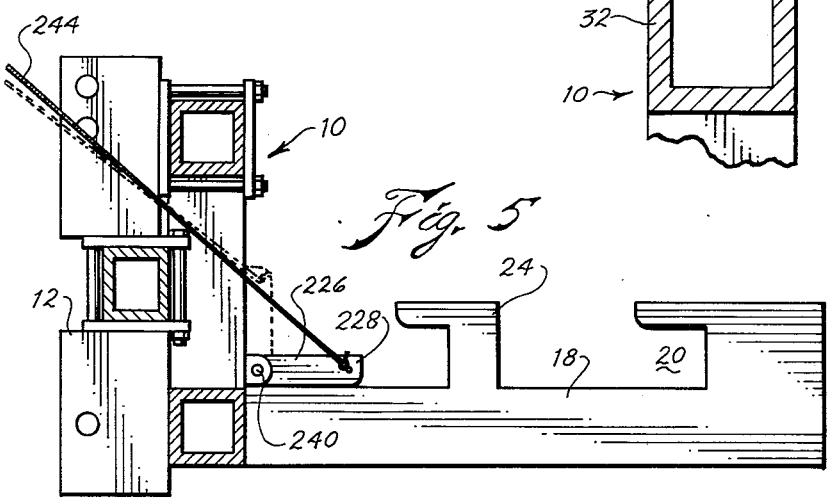
FIG. 5 is a sectional elevational view similar to FIG. 2 showing a second embodiment.

FIG. 5 shows a second embodiment of this invention. The second embodiment is basically the same as the first inasmuch as it is build on a frame 10 having a three point hitch 12 and the support arms 18 as well as C-shaped receiving portions or members 24. In the second embodiment, lock member 226 is in the form of cam or lug 228 upon shaft 240. In this instance the shaft 240 is located slightly above the support arms 18 so that it is in line with the tool bar 22. Hoist line 244 is attached to the lug 228. Therefore, the second embodiment also provides means for the attachment and detachment of the tool bars simply, without the operator leaving his seat on the tractor.

Figure 6:
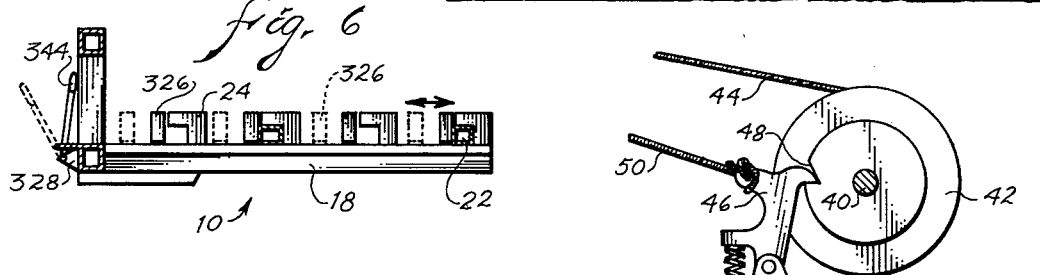
FIG. 6 is a sectional elevational view similar to FIG. 2 showing a third embodiment.

The third embodiment is shown in FIG. 6. The third embodiment, like the previous two, has frame 10. The support arms 18 have the C-shaped receiving portions 24 to receive the tool bar assembly 22. In this third embodiment, lock members 326 are attached to sliding bar 328. The bar is slid forward and back by means of lever 344. It is contemplated that the lever would extend so it could be reached by the operator. The embodiment of FIG. 6 is described in greater detail in my previous patent referred to above.

The C-shaped receiving portions or members 24 have been illustrated as integral with the arms 18. Each C-shaped member could be adjustably attached to a bolted clamp around the arm and thus accommodate different width tool bar assemblies.

Further a mere reversal of elements could make the lock members stationary on the arms and the C-shaped members movable away from the lock members and unlock the tool bar. In such a situation, the post 30 could function as a lock member.

The embodiments shown and described above are only exemplary. I do not claim to have invented all the parts, elements or steps described. Various modifications can be made in the construction, material, arrangement, and operation, and still be within the scope of my invention. The limits of the invention and the bounds of the patent protection are measured by and defined in the following claims. The restrictive description and drawing of the specific example above do not point out what an infringement of this patent would be, but are to enable the reader to make and use the invention.

As an aid to correlating the terms of the claims to the exemplary drawing, the following catalog of elements is provided:

10 frame
12 3-point hitch
14 tractor
16 tractor hitch
18 support arm
20 receiving portion
22 tool bar
23 tool
24 C-shaped rec. mbr.
26 lock member
28 track
30 post
32 horizontal members
34 contact edge
36 halyard
38 pulley or windlass
40 shaft
42 Hoist pulley
44 hoist line
46 detent
48 notch
50 lanyard
226 lock member
228 lug
240 shaft
244 hoist line
326 lock member
328 bar
344 lever

I claim as my invention:

1. In an apparatus for removably supporting an elongated farm tool bar having
   a. a frame adapted to be secured at its front end to a farm vehicle, said frame including
   b. a plurality of parallel rearwardly extending unimpeded support arms,
   c. each of the support arms having at least one tool bar receiving portions thereon,
   d. the tool bar receiving portions in one arm being substantially laterally aligned with the receiving portions of the other arm, and
   e. said farm vehicle having means for raising and lowering the frame; and the improved structure for locking the tool bar into each of the arms comprising in combination with the above:
   f. each of the tool bars receiving portions being C-shaped with the open portion forward facing the front end of the frame, g. movable lock members mounted for attachment on the frame,
h. said lock members contacting the front of the tool bar when the tool bar is received in the C-shaped receiving portion of the support frame,
j. a shaft extending laterally along the frame journalled thereto, and
k. flexible members attached to the shaft,
m. each of the flexible members interconnecting the shaft and one of the lock members, whereby
n. rotation of the shaft winds the flexible members around the shaft,
o. thus raising the lock members from an engaged position to an unengaged position.

2. The invention as defined in claim 1 wherein
q. said lock member is in the form of
 (i) a slider which slides on
 (ii) a track on the frame forward of the C-shaped receiving portion.

3. The invention as defined in claim 2, further comprising:
r. a post and lock member for each support arm, and
s. said track on said post.

4. In an apparatus for removably supporting an elongated farm tool bar having
a. a frame adapted to be secured at its front end to a farm vehicle, said frame including
b. a plurality of parallel rearwardly extending unimpeded support arms,
c. each of the support arms having at least one tool bar receiving portions thereon,
d. the tool bar receiving portions in one arm being substantially laterally aligned with the receiving portions of the other arm, and
e. said farm vehicle having means for raising and lowering the frame; THE IMPROVED STRUCTURE FOR LOCKING THE TOOL BAR INTO EACH OF THE ARMS COMPRISING IN COMBINATION WITH THE ABOVE:
f. each of the tool bars receiving portions being C-shaped with the open portion forward facing the front end of the frame so that the tool bar substantially fills the C-shaped opening when in place,
g. movable lock members mounted for attachment on the frame,
h. said lock members contacting the front of the tool bar when the tool bar is received in the C-shaped receiving portions of the support arms, and
j. unlocking means on the frame for moving the lock member away from the tool bar,
k. a post and lock member on each support arm,
m. said post extending vertically upward from the forward portion of the support arm,
n. said lock members are in the form of sliders which slide on
o. tracks on the post.

5. In an apparatus for removably supporting an elongated farm tool bar having
a. a frame adapted to be secured at its front end to a farm vehicle, said frame including
b. a plurality of parallel rearwardly extending unimpeded support arms,
c. each of the support arms having at least one tool bar receiving portions thereon,
d. the tool bar receiving portions in one arm being substantially laterally aligned with the receiving portions of the other arm, and
e. said farm vehicle having means for raising and lowering the frame; THE IMPROVED STRUCTURE FOR LOCKING THE TOOL BAR INTO EACH OF THE ARMS COMPRISING IN COMBINATION WITH THE ABOVE:
f. each of the tool bars receiving portions being C-shaped with the open portion forward facing the front end of the frame so that the tool bar substantially fills the C-shaped opening when in place,
g. movable lock members for attachment on the frame,
h. said lock members contacting the front of the tool bar when the tool bar is received in the C-shaped receiving portion of the support arms, and
j. unlocking means on the frame for moving the lock member away from the tool bar,
k. said unlocking means includes
 (i) a shaft extending laterally along the frame journalled thereto, and
 (ii) said lock members connected to the shaft
 (iii) so that rotation of the shaft moves the lock member.

6. The invention as defined in claim 5 with the additional limitations of
p. a post and lock member on each support arm,
m. said post extending vertically upward from the forward portion of the support arm,
n. said lock members are in the form of sliders which slide on
o. tracks on the post.

7. The invention as defined in claim 5 with an additional limitation of
o. said lock member directly attached to said shaft and extending rearwardly therefrom.

* * * * *